(12) United States Patent
Peyton et al.

(10) Patent No.: US 10,339,518 B2
(45) Date of Patent: Jul. 2, 2019

(54) METHOD AND SYSTEM FOR DIRECT CARRIER BILLING

(71) Applicant: MasterCard International Incorporated, Purchase, NY (US)

(72) Inventors: Kimberly Lewis Peyton, New York, NY (US); Pablo Fourez, Waterloo (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 682 days.

(21) Appl. No.: 14/881,715

(22) Filed: Oct. 13, 2015

(65) Prior Publication Data

US 2016/0104146 A1    Apr. 14, 2016

Related U.S. Application Data

(60) Provisional application No. 62/064,715, filed on Oct. 16, 2014, provisional application No. 62/063,231, filed on Oct. 13, 2014.

(51) Int. Cl.
*G06Q 40/00* (2012.01)
*G06Q 20/32* (2012.01)
(Continued)

(52) U.S. Cl.
CPC ........... *G06Q 20/325* (2013.01); *G06Q 20/12* (2013.01); *G06Q 20/16* (2013.01)

(58) Field of Classification Search
CPC .................................................. G06Q 20/325
(Continued)

(56) References Cited

U.S. PATENT DOCUMENTS 5,991,749 A * 11/1999 Morrill, Jr. ............ G06Q 20/04
                                                                    705/13
6,636,833 B1    10/2003 Flitcroft et al.
(Continued)

FOREIGN PATENT DOCUMENTS

EP       2 098 976 A1    9/2009
WO    2013155627 A1   10/2013

OTHER PUBLICATIONS

International Search Report and Written Opinion issued in corresponding International Patent Application No. PCT/US2015/055292 (11 pages).

*Primary Examiner* — Samica L Norman
(74) *Attorney, Agent, or Firm* — Buchanan Ingersoll & Rooney PC

(57) ABSTRACT

A method for processing a transaction, comprising: receiving, by an aggregator from a merchant, a transaction data signal electronically transmitted via a communication network; transmitting, by the aggregator to a mobile network operator (MNO), an authorization message; receiving, by the aggregator from the MNO, an approval transaction data signal; transmitting, by the aggregator to a payment network, a request message configured to indicate a virtual card number (VCN) request associated with the MNO's transaction account for the transaction amount; receiving, by the aggregator from the payment network, a VCN transaction data signal; and transmitting, to the payment network, a VCN message indicating the VCN initiation of a payment transaction.

20 Claims, 6 Drawing Sheets

(51) Int. Cl.
*G06Q 20/12* (2012.01)
*G06Q 20/16* (2012.01)

(58) Field of Classification Search
USPC .......... 705/26.41, 13, 14, 2, 19, 71, 44; 455/405
See application file for complete search history.

(56) References Cited

U.S. PATENT DOCUMENTS

| | | | |
|---|---|---|---|
| 7,136,835 B1 | 11/2006 | Flitcroft et al. | |
| 7,567,934 B2 | 7/2009 | Flitcroft et al. | |
| 7,571,142 B1 | 8/2009 | Flitcroft et al. | |
| 7,593,896 B1 | 9/2009 | Flitcroft et al. | |
| 8,510,218 B2 | 8/2013 | Abel et al. | |
| 8,527,416 B2 | 9/2013 | Flitcroft et al. | |
| 8,639,623 B2 | 1/2014 | Kavanagh et al. | |
| 8,676,707 B2 | 3/2014 | Flitcroft et al. | |
| 8,756,150 B2 | 6/2014 | Flitcroft et al. | |
| 2001/0039535 A1* | 11/2001 | Tsiounis | G06Q 20/02 705/71 |
| 2006/0276171 A1* | 12/2006 | Pousti | G06Q 20/02 455/405 |
| 2007/0276736 A1 | 11/2007 | Guilfoyle | |
| 2009/0070260 A1 | 3/2009 | Flitcroft et al. | |
| 2009/0157519 A1* | 6/2009 | Bishop | G06Q 20/02 705/19 |
| 2013/0132235 A1* | 5/2013 | Gandhi | G06Q 30/0601 705/26.41 |
| 2014/0129422 A1 | 5/2014 | Zhou et al. | |
| 2014/0187197 A1 | 7/2014 | Sege | |
| 2014/0279469 A1 | 9/2014 | Mendes | |
| 2014/0279472 A1 | 9/2014 | Caglayan et al. | |
| 2014/0288949 A1* | 9/2014 | Eromo | G06Q 20/16 705/2 |
| 2015/0120549 A1* | 4/2015 | Khalid | G06Q 20/4014 705/44 |

* cited by examiner

METHOD AND SYSTEM FOR DIRECT CARRIER BILLING

FIELD

The present disclosure relates to the processing of payment transactions for direct carrier billing through the use of virtual card numbers (VCNs).

BACKGROUND

Merchants that are involved with payment transactions are often interested in providing consumers with easier, simpler methods of payment. Multiple payment options, such as cash, check, credit card, debit card, and gift card, as well as payment services such as PayPal™, BillMeLater™, and the like are available for consumers to purchase products and/or services. In pursuit of greater convenience and more rapid transactions at point of sale (POS) terminals, payment cards have more recently been developed that allow the account number to be automatically read from the card. These cards are often referred to as "proximity payment cards" or "contactless payment cards," and they utilize radio frequency identification (RFID).

Other proximity payment schemes are also increasingly in use. For example, capabilities of paying with a mobile device, such as a mobile telephone, thereby turning the mobile device into a contactless payment device have also been implemented. Merchants may enable a smartphone user to pay for a transaction by inputting or transmitting their telephone number, and having their mobile network operator charge them as per their usual billing process. In some implementations, this may occur through a direct carrier billing system which allows customers to use their mobile device to make purchases, and pay for those purchases by allowing those purchases to be charged back to their phone bill or their direct billing account with the carrier. In order to provide this payment option, companies that are direct carrier billing providers and/or aggregators, must sign up with various merchants and mobile network operators, leaving the entire system in a closed loop network.

One issue that is raised by this proposal is that in order to implement this system, the direct carrier billing provider and/or aggregator must have merchants as well as mobile network operators (MNOs) sign up for their system in order to connect the merchant with the MNO. In such an instance, the mobile network operator and/or a third party entity may aggregate transactions for settlement. This would facilitate the billing of that purchase back to the consumer's mobile account. This process may be time consuming for the direct carrier billing providers and/or aggregators, as well as inconvenient for consumers who might not know which merchants participate in the payment system, which may result in significant technological and legal disadvantages.

SUMMARY

The presently disclosed system solves the above identified issues by processing payment transactions for direct carrier billing through the use of virtual card numbers (VCNs) depending on implementations.

In the present system, a consumer may shop and pick out an item for purchase. The consumer may bring the item to the POS device, wherein a merchant may enable a smartphone user to pay for a transaction by inputting or transmitting their telephone number. In some implementations, the consumer may select a pay with mobile option on their mobile device which may be pre-populated if they have registered before. The consumer may select this option and the system may automatically populate the consumer's mobile number and/or request that the consumer enter their mobile number at the POS. The merchant may then pass the phone number to an aggregator along with the transaction amount (might not include taxes, etc.).

The aggregator may then pass information to a MNO requesting approval for the purchase. In some implementations, the aggregator may send the approval for purchase request to the MNO and/or someone who is acting on behalf of the MNO (e.g., a payment network). The MNO may then confirm that the credit and/or funds are available and allow the consumer to make the transaction. In some implementations, the consumer may be a prepaid customer and the MNO may check the consumer's account to make sure there are enough prepaid phone balance in the consumer's account to cover the purchase. For example, if the consumer places $50 on their prepaid phone account and are being charged for a $20 purchase, then the MNO would know that there is enough money in the account to cover the transaction and based on that or other factors, may decide to approve the transaction. If the MNO declines a transaction, they may notify the aggregating entity, which may notify the merchant which may then cancel the transaction.

If the transaction is approved by the MNO, then the aggregating entity may request a VCN from a payment network. The payment network may be configured to identify and/or issue VCNs for use in direct carrier billing transactions. The payment network may receive the request for a VCN. In some embodiments, the request may include the MNO and/or a transaction account associated with the MNO. The payment network may then identify a VCN and associate it with the MNO's transaction account. The payment network may return the identified VCN to the aggregating entity.

The aggregating entity may receive a VCN and may provide the approval of the transaction and the VCN to be associated with the mobile device to the merchant. The merchant may receive the VCN and approval, may process the payment transaction accordingly. The aggregator may initiate processing of the payment for the payment transaction, or may aggregate transactions for processing of payment of a single, aggregate payment transaction. When the merchant is ready, the merchant and/or acquiring financial institution acting on behalf of the merchant (e.g., an acquiring bank) may generate an authorization request for the payment transaction. The authorization request may be for the transaction amount (e.g., aggregated, if applicable) and may include the VCN associated with the mobile device in place of a traditional transaction account number. The authorization request may then be submitted to the payment network which may identify that a VCN was used in the transaction, and may switch the VCN for the transaction account number associated with the MNO's associated transaction account. Depending on implementation, the VCN can be used as a unique identifier of either the transaction (if a single use VCN) or the consumer (if so limited) for post-transaction accounting and tracking.

The authorization request may then be forwarded to an issuing financial institution (e.g., an issuing bank) associated with the MNO's transaction account or another suitable entity for processing thereof. The issuing financial institution may approve or decline the payment transaction using traditional methods and systems but, rather than check against the credit or balance of the consumer, the issuing financial institution is checking against the credit and/or balance of the MNO. An authorization response may be generated by the issuing financial institution, and provided to the payment network that may then proceed with the payment transaction accordingly. As a result, the merchant may provide the consumer with the ability to conduct payment transactions with billing from their MNO without the need to ever provide any payment information.

In some implementations, the method for processing a transaction may comprise receiving, by an aggregator from a merchant, a transaction data signal electronically transmitted via a communication network, wherein the data signal is superimposed with a transaction request comprising a device identifier of a consumer mobile device affiliated with a consumer account and a transaction amount. The aggregator may transmit to a mobile network operator (MNO), an authorization message formatted based on one or more standards configured to indicate an authorization request for approval of the transaction request. The aggregator may receive from the MNO, an approval transaction data signal electronically transmitted via a communication network, wherein the data signal is superimposed with approval of the transaction request confirming the consumer account has enough available funding to complete the transaction. The aggregator may transmit to a payment network, a request message formatted based on one or more standards configured to indicate a virtual card number (VCN) request associated with the MNO's transaction account for the transaction amount. The aggregator may receive from the payment network, a VCN transaction data signal electronically transmitted via a communication network, wherein the data signal is superimposed with a VCN in response to the VCN request, wherein the VCN is associated with the MNO's transaction account. Transmission of a VCN message formatted based on one or more standards configured to indicate the VCN initiation of a payment transaction to the payment network may be implemented.

In some implementations, the system for processing a transaction may comprise a receiving device of an aggregator server configured to: receive, from a merchant, a transaction data signal electronically transmitted via a communication network, wherein the data signal is superimposed with a transaction request comprising a device identifier of a consumer mobile device affiliated with a consumer account and a transaction amount. A transmitting device of the aggregator server may be configured to: transmit, to a mobile network operator (MNO), an authorization message formatted based on one or more standards configured to indicate an authorization request for approval of the transaction request; wherein the receiving device of the aggregator server is further configured to receive, from the MNO, an approval transaction data signal electronically transmitted via a communication network, wherein the data signal is superimposed with approval of the transaction request confirming the consumer account has enough available funding to complete the transaction. The transmitting device of the aggregator server may be further configured to transmit, to a payment network, a request message formatted based on one or more standards configured to indicate a virtual card number (VCN) request associated with the MNO's transaction account for the transaction amount. The receiving device of the aggregator server may be further configured to receive, from the payment network, a VCN transaction data signal electronically transmitted via a communication network, wherein the data signal is superimposed with a VCN in response to the VCN request, wherein the VCN is associated with the MNO's transaction account. The transmitting device of the aggregator server may be further configured to transmit to the payment network, a VCN message formatted based on one or more standards configured to indicate the VCN initiation of a payment transaction.

DESCRIPTION OF DRAWING FIGURES

The present invention will now be described by way of a number of exemplary embodiments to which it is not limited, with reference to the accompanying drawings in which.

DETAILED DESCRIPTION

Glossary of Terms

Figure 1:
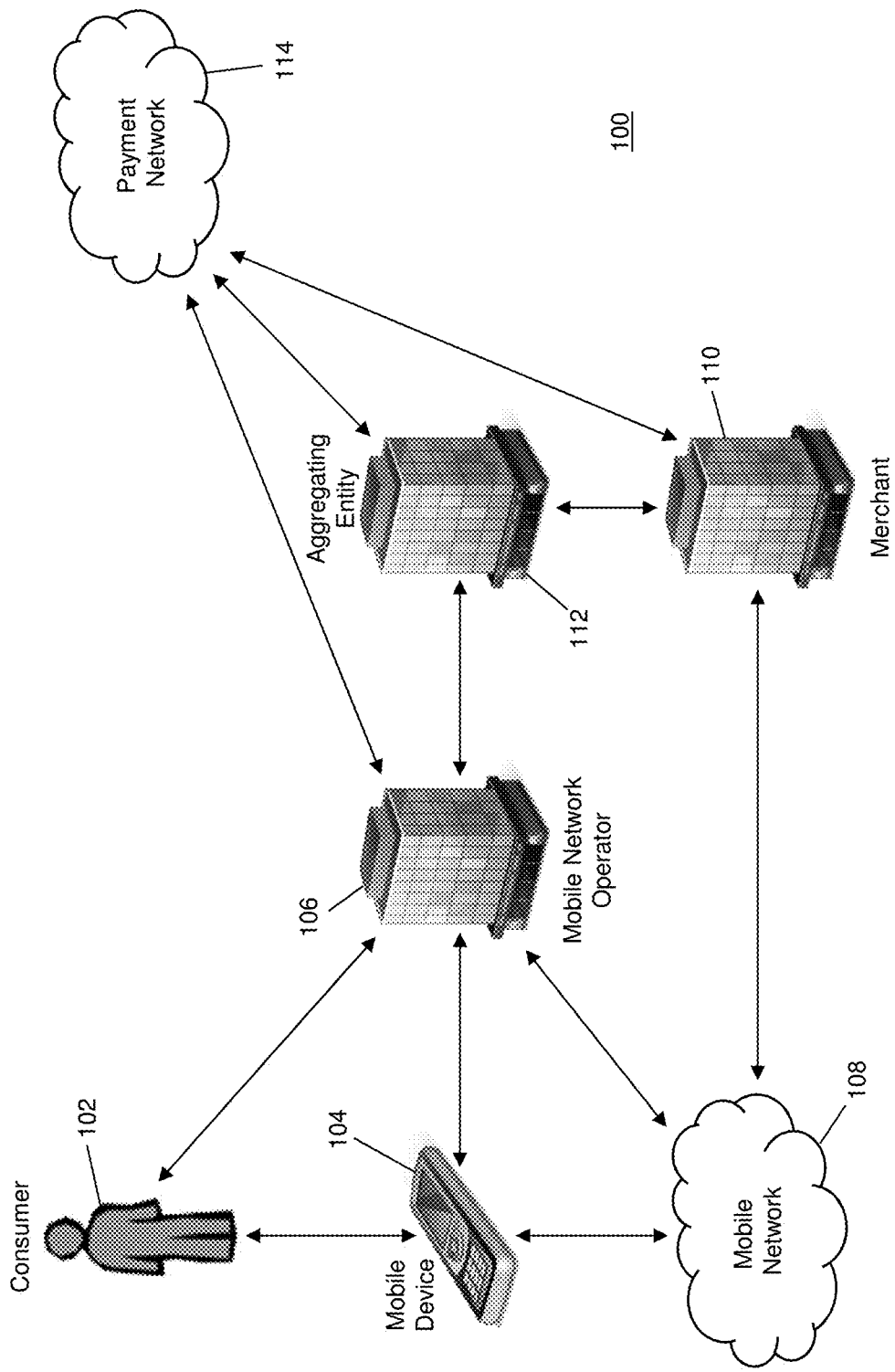
FIG. 1 is a block diagram illustrating a high level system for direct carrier billing using VCNs in accordance with exemplary embodiments.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Aggregator—An aggregator (used interchangeably throughout the specification with direct carrier billing entity and/or aggregating entity) processes payment transactions for individual consumers across a range of merchants, resulting in a credit/debit card transactional volume high enough to allow the aggregator to contract with a plurality of payment processors (with different pricing models). This, in turn, allows the aggregator to dynamically select the optimal processor for each transaction. Additionally, the aggregator may bundle multiple payment transactions of a single consumer across multiple merchants for additional savings.

Controlled Payment Number (CPN)—Controlled payment numbers may be payment numbers associated with a payment account that are subject to one or more rules. In many cases, these rules may be set by a cardholder, such as spending limits, limits on days and/or times of a transaction, limits on merchants or industries, transaction spending or frequency limits, etc. Controlled payment numbers may offer an account holder an opportunity to give payment cards tied to the account to others for use, but subject to rules set by the cardholder, such as an employer distributing cards to employees, or a parent distributing cards to children. Additional detail regarding controlled payment numbers may be found in U.S. Pat. No. 6,636,833, issued Oct. 21, 2003; U.S.

Pat. No. 7,136,835, issued Nov. 14, 2006; U.S. Pat. No. 7,571,142, issued Aug. 4, 2009; U.S. Pat. No. 7,567,934, issued Jul. 28, 2009; U.S. Pat. No. 7,593,896, issued Sep. 22, 2009; U.S. Pat. No. 8,639,623, issued Jan. 28, 2104; U.S. Pat. No. 8,510,218, issued Aug. 13, 2013; U.S. Pat. No. 8,527,416, issued Sep. 3, 2013; U.S. Published Patent Application No. 2007/0276736, published Nov. 29, 2007; U.S. patent application Ser. No. 12/219,952, filed Jul. 30, 2008; U.S. patent application Ser. No. 12/268,063, filed Nov. 10, 2008; U.S. patent application Ser. No. 12/359,971, filed Jan. 26, 2009; and European Published Application No. EP2098976, published Sep. 9, 2009, each of which are herein incorporated by reference in their entirety.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require and special knowledge in offered products. In some embodiments, an entity involved in a single transaction may be considered a merchant. In some implementations, a merchant may broadly connote any seller of goods and/or services, often, but not necessarily, at a point of sale (POS) location.

Mobile Network Operator (MNO)—A provider of wireless communications services that owns or controls all the elements necessary to provide cellular services to an end consumer.

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Virtual Card Number (VCN)—A number that is associated with one or more real and/or transaction accounts, and that may be used in place of transaction account numbers in the processing of a payment transaction. In some instances, a virtual card number may be a controlled payment number.

System for Direct Carrier Billing Using VCNs

FIG. 1 illustrates a system 100 for direct carrier billing for payment transactions conducted using mobile devices via the use of virtual card numbers (VCNs).

In the system 102, a consumer 102 may have a mobile device 104. The mobile device 104 may be any type of mobile communication device suitable for performing the functions disclosed herein, such as a cellular phone, smart phone, tablet computer, notebook computer, laptop computer, personal digital assistant, smart watch, wearable computing device, etc. The mobile device 104 may be configured to communicate via a mobile network 108. The mobile network 108 may be operated by a mobile network operator (MNO) 106. The MNO 106 may be an entity configured to own, maintain, operate, or otherwise be associated with the mobile network 108.

The consumer 102 may pay a fee to the mobile network operator 106 in order to utilize the mobile network 108 with mobile device 104. For instance, the consumer 102 may make monthly payments to the mobile network operator 106 as a subscription to the mobile network 108, may pay per use of the mobile network 108, or may pay at a regular interval based on usage of the mobile network 108. As a result, the mobile network operator 106 may bill the consumer 102 for services, or deduct money from an account held by the consumer 102 with the mobile network operator 106.

The mobile device 104 may be associated with one or more device identifiers. Device identifiers may be unique values associated with the mobile device 104 that may be used for the identification thereof. Device identifiers may include telephone numbers, media access control (MAC) addresses, a unique device id (UUID), an international mobile station equipment identity (IMEI), internet protocol address, serial numbers, registration numbers, usernames, and/or nearly any other unique identifier. The mobile network operator 106 may use a device identifier associated with the mobile device 104 for identification and management of an account associated with the mobile device 104 and the consumer 102.

The consumer 102 may conduct a payment transaction with a merchant 110 using the mobile device 104 via the mobile network 108. The payment transaction may be conducted via an Internet webpage of the merchant 110 using a web browsing application program, via an application program executed by the mobile device 104 and associated with the merchant 110, or any other suitable method for conducting a payment transaction using a mobile device 104. In some implementations, payment may occur at a merchant POS. In order to pay for the payment transaction, the consumer 102 may provide a device identifier associated with the mobile device 104 to the merchant 110, such as a telephone number, either by inputting it or by operation of a program on the smart phone, e.g., an in-app purchase function that will forward the mobile device's identification to the merchant 110 or directly to an aggregator entity 112.

In some implementations, where a telephone number is used to pay for a transaction, the merchant 110 may charge the MNO 106 the amount of the transaction to be paid by the MNO 106, and the MNO 106 may, in turn, charge the consumer 102 for the amount, such as during the usual course of billing (e.g., on the consumer's 102 next statement). In some instances, the MNO 106 may deduct the transaction amount from an account of the consumer 102, such as a prepaid account or an account with a standing balance. Additional information regarding systems for billing an MNO 106 by a merchant 110 can be found in Singaporean Patent Application No. 12701SG58 to Murali et al., entitled "Conducting a Transaction Between a Service Provider and a Merchant" which is herein incorporated by reference in its entirety. In the methods and systems discussed herein, including the system 100, the merchant 110 may instead provide the device identifier to an aggregating entity 112.

The aggregating entity 112 may be an entity configured to aggregate and process payment transactions on behalf of the MNO 106 for processing, which may result in less expenditure of resources and greater efficiency in operations for the MNO 106. The aggregating entity 112 may also be able to provide for access to multiple MNOs for a merchant 110, without the merchant 110 having to contact and set up billing with a plurality of MNOs. As a result, use of the aggregating entity 112 can also provide merchants 110 with faster and easier processing of payment transactions using direct carrier billing, and may also provide for an easier entry for merchants 110 into direct carrier billing by providing access to multiple MNOs 106 and thereby offer the merchant 110 with a significantly larger consumer base than may be traditionally available.

Systems that facilitate mobile payments typically allow the user to present a mobile device at the point of sale (POS); the mobile device displays a payment token (usually in the form of a barcode, QR code, and/or transmitted by near field communications (NFC)) generated by the transaction aggregator and accepted by the merchant as an assurance of payment. Many merchants, particularly those who conduct a large number of transactions for relatively low transaction amounts, can benefit from the aggregation of payment transactions, at least at settlement. Aggregation includes the batch processing of a plurality of payment transactions in order to minimize the processing fees incurred therein. In some implementations, the VCN may issuer for the aggregated amount. For instance, a merchant may hold on processing a number of $1 transactions for a consumer until the transactions total $10 or accumulated in a given time frame, and may then process a single $10 transaction for the consumer. In some instances, a separate entity may aggregate transactions on behalf of a merchant.

The aggregating entity 112 may receive a device identifier from the merchant 110 for the transaction being conducted using the associated mobile device 104. The aggregating entity 112 may provide the device identifier (e.g., telephone number) and transaction amount to the mobile network operator 106 for verification of the device identifier and approval for payment of the transaction. The MNO 106 may verify the device identifier and decide on approval of payment based on criteria such as account balance, available credit, status of the consumer or account, risk of fraud, collections calculation, and/or any other payment approval method. If the MNO 106 declines the transaction, they may notify the aggregating entity 112, who may notify the merchant 110, who may then cancel the transaction.

If the transaction is approved by the MNO 106, then the aggregating entity 112 may request a VCN from a payment network 114. The payment network 114 may be configured to identify and/or issue VCNs for use in direct carrier billing transactions. The payment network 114 may receive the request for a VCN. In some embodiments, the request may include the MNO 106 and/or a transaction account associated with the MNO 106. The payment network 114 may then identify a VCN and associate it with the MNO's 106 transaction account. The payment network 114 may return the identified VCN to the aggregating entity.

In some embodiments, the VCN may include a bank identification number (BIN) associated with the MNO 106, a credit card number, a debit card number, a check number and/or any other identification number. For example, the payment network 114 may assign a range of BINs to the MNO 106, and may issue VCNs whose included BIN is in the assigned range. In such an instance, the payment network 114 may identify any payment transaction that includes a transaction account number in the assigned BIN range for processing using the MNO's 106 associated transaction account.

The aggregating entity 112 may receive a VCN and approval by the MNO, and may forward the approval of the transaction (e.g., by the MNO 106) and the VCN to be associated with the mobile device 104 to the merchant 110. Note that a VCN can be sent for each transaction, and/or a VCN can be sent to the merchant 110 for a number of MNO-approved transactions. The merchant 110 may receive the VCN and approval, may process the payment transaction accordingly. The aggregator 112 may immediately initiate processing of the payment for the payment transaction, and/or may aggregate transactions for processing of payment of a single, aggregate payment transaction. For example, if the transaction amount is below a predetermined level (e.g., less than $5), the aggregator 112 may aggregate payment transactions until the consumer 102 has aggregated at least a predetermined amount to be paid (e.g., $25).

When the merchant 110 is ready, the merchant 110 and/or an acquiring financial institution acting on behalf of the merchant 110 (e.g., an acquiring bank) may generate an authorization request for the payment transaction using the VCN. The authorization request may be for the transaction amount (e.g., aggregated, if applicable) and may include the VCN associated with the mobile device 104 or an aggregation of transactions from a mobile device or a plurality of mobile devices in place of a real transaction account number. The authorization request may then be submitted to the payment network 114. The payment network 114 may receive the authorization request, may identify that a VCN was used in the transaction (e.g., based on the BIN), and may switch the VCN for the transaction account number associated with the MNO's 106 associated transaction account.

The authorization request may then be forwarded to an issuing financial institution (e.g., an issuing bank) associated with the MNO's 106 transaction account or another suitable entity for processing thereof. The issuing financial institution may approve or decline the payment transaction using traditional methods and systems. An authorization response may be generated by the issuing financial institution, and provided to the payment network 114. The payment network 114 may then proceed with the payment transaction accordingly. If the transaction is approved and processed, settlement of the transaction may include the transmitting of the transaction amount from the issuing financial institution (e.g., using the MNO's 106 transaction account) to the merchant 110. The issuing financial institution and/or MNO 106 may, in turn, charge the consumer 102 for repayment of the amount.

Methods and systems discussed herein thereby enable the merchant 110 to provide consumers 102 with the opportunity to pay using a device identifier associated with their mobile device 104 (e.g., a phone number) without the need to modify existing payment infrastructure and negotiate directly with MNOs 106. In addition, in instances where the device identifier may be transmitted directly from the mobile device 104 during a transaction, the device identifier may be used without requiring input by the consumer 102. As a result, the merchant 110 may provide the consumer 102 with the ability to conduct payment transactions with billing from their MNO 106 without the need to ever provide any payment information.

In some embodiments, the aggregating entity 112 may be configured to receive commissions for processed payment transactions from the merchant 110 and/or MNO 106, such as for compensation for required processing and for the additional efficiency and improvements afforded to the merchant 110 and MNO 106 via its role in the processing of the payment transactions. In such an embodiment, the aggregating entity 112 may generate an invoice to provide to the merchant 110 for commission for each of the payment transactions conducted via VCNs provided by the aggregating entity. The merchant 110 may then pay the commission payment to the aggregating entity 112. In some instances, the aggregating entity 112 may forward some or all of the commission payment to the respective MNO 106.

Processing Server

Figure 2:
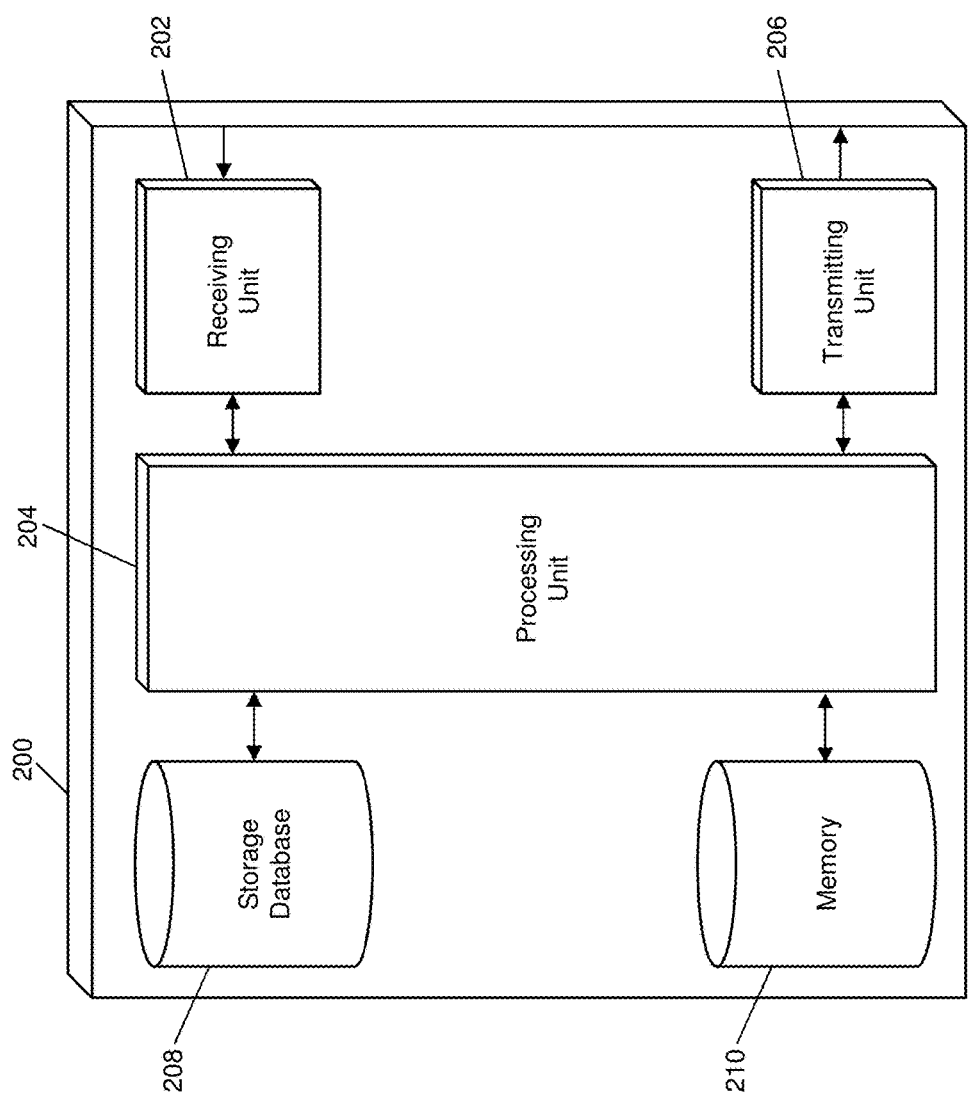
FIG. 2 is a block diagram illustrating a high level architecture of a processing server in accordance with exemplary embodiments.

FIG. 2 illustrates a processing server 200. The processing server 200 may be one or more computing devices configured to perform the functions of any one of the entities of the system 100 discussed herein, such as the mobile device 104, MNO 106, merchant 110, aggregating entity 112, and payment network 114.

The processing server 200 may include a receiving unit 202. The receiving unit 202 may be configured to receive data over one or more networks via one or more network protocols. The processing server 200 may also include a processing unit 204. The processing unit 204 may be configured to perform the functions of the respective entity or device discussed herein that will be apparent to persons having skill in the relevant art. The processing server 200 may further include a transmitting unit 206. The transmitting unit 206 may be configured to transmit data over one or more networks via one or more network protocols.

The processing server 200 may also include one or more storage databases 208. Each storage database 208 may be configured to store data and may include a plurality of data entries, profiles, or other data items suitable for use in performing the functions of the respective processing server 200. Each processing server 200 may also include a memory 210, which may be configured to store additional data suitable for performing the functions of the respective processing server 200, such as rules, algorithms, variables, etc.

A processing server 200 of the MNO 106 may include a receiving unit 202 configured to receive transaction requests from the aggregating entity 112. Transaction requests may include phone numbers or other device identifiers. The storage database 208 may be used to store account information associated with mobile devices 104 and consumers 102 using device identifiers, including credit information, account balances, etc. The processing unit 204 may be configured to approve or deny transactions based on data included in account information stored in the storage database 208, which may be further based on rules and algorithms stored in the memory 210. The processing unit 204 may also be configured to charge a consumer 102 for payment transactions conducted using their mobile device 104, such as charging via normal billing processes, deducting from their account balance, etc. The transmitting unit 206 may be configured to transmit approval or denial of a transaction back to the aggregating entity 112.

A processing server 200 of the merchant 110 may include a receiving unit 202 configured to receive transaction data for a payment transaction to be processed, such as via the mobile network 108. The transmitting unit 206 may be configured to transmit a device identifier included in the transaction data to the aggregating entity 112, which may return a VCN associated thereto. The processing unit 204 may be configured to store a data entry in the storage database 208 for the mobile device 104 that includes the device identifier and the associated VCN for use in future payment transactions. The transmitting unit 206 may also be configured to transmit the transaction data including the VCN in place of the device identifier to an acquirer and/or the payment network 114 for processing. The receiving unit 202 may be further configured to receive authorization responses for payment transactions, which may be processed accordingly using the processing unit 204. In embodiments where the merchant 110 may aggregate transactions, the data entries in the storage database 208 may include aggregate amounts and limits, and the memory 210 may include rules regarding the aggregation and processing of payment transactions.

A processing server 200 of the aggregating entity 112 may include a receiving unit 202 configured to receive device identifiers and transaction amounts from the merchant 110. The transmitting unit 206 may transmit the device identifier and transaction amount for a transaction to the MNO 106 for approval. The receiving unit 202 may receive the approval for a transaction from the MNO 106, which may prompt the transmitting unit 206 to transmit a VCN request to the payment network 114 that may include the device identifier. The request may also include information identifying the MNO 106, such as a transaction account number. The receiving unit 202 may receive a VCN to be associated with the device identifier. The processing unit 204 may store a data entry in the storage database 208 that includes device identifiers, associated VCNs, and associated MNOs 106. The storage database 208 may also include a record of transactions conducted using a VCN, such as for reporting to the associated MNO 106 (e.g., by the transmitting unit 206). The processing unit 204 may also be configured to generate invoices for commission payments, to be transmitted to the merchant 110 by the transmitting unit 206.

A processing server 200 included in the payment network 114 may include a receiving unit 202 configured to receive VCN requests. In some instances, the VCN may include a specific BIN or a BIN within a range of BINs associated with an MNO 106 associated with the received device identifier. The transmitting unit 206 may transmit the identified VCN to the aggregating entity 112, and the processing unit 204 may store a data entry in the storage database 208 that includes a device identifier, the associated VCN, and a transaction account for the MNO 106 associated with the device identifier. The receiving unit 202 may be further configured to receive authorization requests for payment transactions that include VCNs. In such a transaction, the processing unit 204 may swap the VCN for the transaction account number for the MNO 106 that is included in the data entry that includes the VCN. The receiving unit 202, processing unit 204, and transmitting unit 206 may each be further configured to perform the functions necessary for conducting a payment transaction using the transaction account number that will be apparent to persons having skill in the relevant art.

Example VCN Direct Carrier Billing Processing

Figure 3:
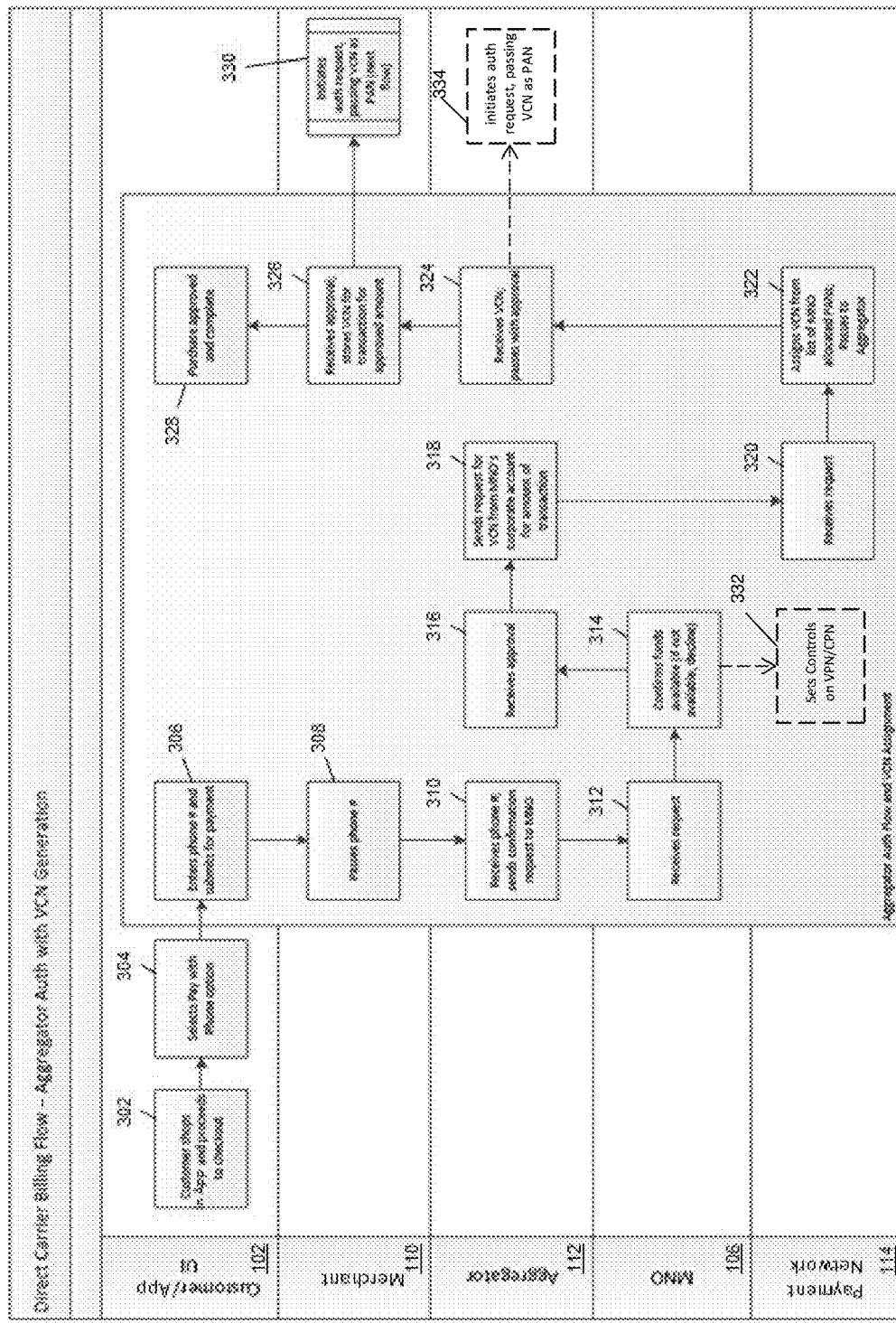
FIG. 3 is a flow diagram illustrating a process for direct carrier billing via using VCNs in accordance with exemplary embodiments.

FIG. 3 illustrates an example process for direct carrier billing through the use of VCNs using the system 100 of FIG. 1.

In step 302, the consumer 102 may shop with the merchant 110 using an application program on their mobile device 104. The consumer 102 may select one or more products for purchase and may proceed to checkout. As part of the checkout process for the product(s), in step 304, the consumer 102 may choose to pay using a telephone number or other device identifier associated with the mobile device 104. In step 306, the consumer 102 may enter their telephone number and submit the transaction for payment and processing. In some embodiments, the telephone number or other device identifier may be identified and included in the transaction data by the mobile device 104 itself.

The phone number may be passed to the merchant as part of the transaction processing, who, in step 308, may forward the phone number and other transaction data on to the aggregating entity 112. The aggregating entity 112 may receive the phone number and, in step 310, may communicate with the MNO 106 (e.g., direct carrier) associated with the mobile device 104 to verify the phone number and receive approval for the transaction. In step 312, the MNO 106 may receive the transaction data and phone number. In step 314, the MNO 106 may verify the phone number and may approve the transaction, such as if the consumer 102 has enough funds in their account, has enough credit, status information, etc. In some implementations, the MNO may approve the transaction based on the consumer's account payment history. For example, if the consumer regularly paid their bill on time and with the full amount, the MNO may take a risk on the consumer and approve without acquiring funds before approval. In some implementations, at step 332, the MNO may set controls on any VPNs generated through applying controlled payment numbers (CPN) associated with a payment account that are subject to one or more rules. In some implementations, these rules may be set by a cardholder, such as spending limits, limits on days and/or times of a transaction, limits on merchants or industries, transaction spending or frequency limits, etc. Controlled payment numbers may offer an account holder an opportunity to give payment cards tied to the account to others for use, but subject to rules set by the cardholder, such as an employer distributing cards to employees, or a parent distributing cards to children.

In step 316, the aggregating entity 112 may receive the transaction approval from the MNO 106. In step 318, the aggregating entity 112 may send a request for a VCN to the payment network 114. The request may include at least the phone number associated with the mobile device 104 and information identifying the MNO 106 and/or a transaction account associated thereof. In step 320, the payment network 114 may receive the request and may, in step 322, identify a VCN to be used for transactions involving the mobile device 104. In some instances, the identified VCN may have a BIN that corresponds to a BIN or BIN range associated with the identified MNO 106. In some embodiments, step 322 may also identify a transaction account associated with the MNO 106 if one is not already identified, such as based on the MNO 106 information included in the received VCN request.

In step 324, the VCN may be provided to the aggregating entity 112, who may provide the VCN and approval of the transaction back to the merchant. In some implementations, in step 334 the aggregating entity 112 may initiate an authorization request to continue processing of the payment transaction, illustrated in FIG. 4 and discussed below. In step 328, the consumer 102 may receive approval of the transaction, which may include receiving the transacted-for products.

In step 326, the merchant 110 may receive the VCN and approval and may provide the purchased for products to the consumer 102. In step 328, the consumer 102 or merchant 110 may receive approval of the transaction, which may include receiving the transacted-for products. In step 330, the merchant 110 may continue processing of the payment transaction, illustrated in FIG. 4 and discussed below. In some instances, the merchant 110 may wait to process payment for the payment transaction until the consumer 102 has aggregated a predetermined amount from transactions.

Figure 4:
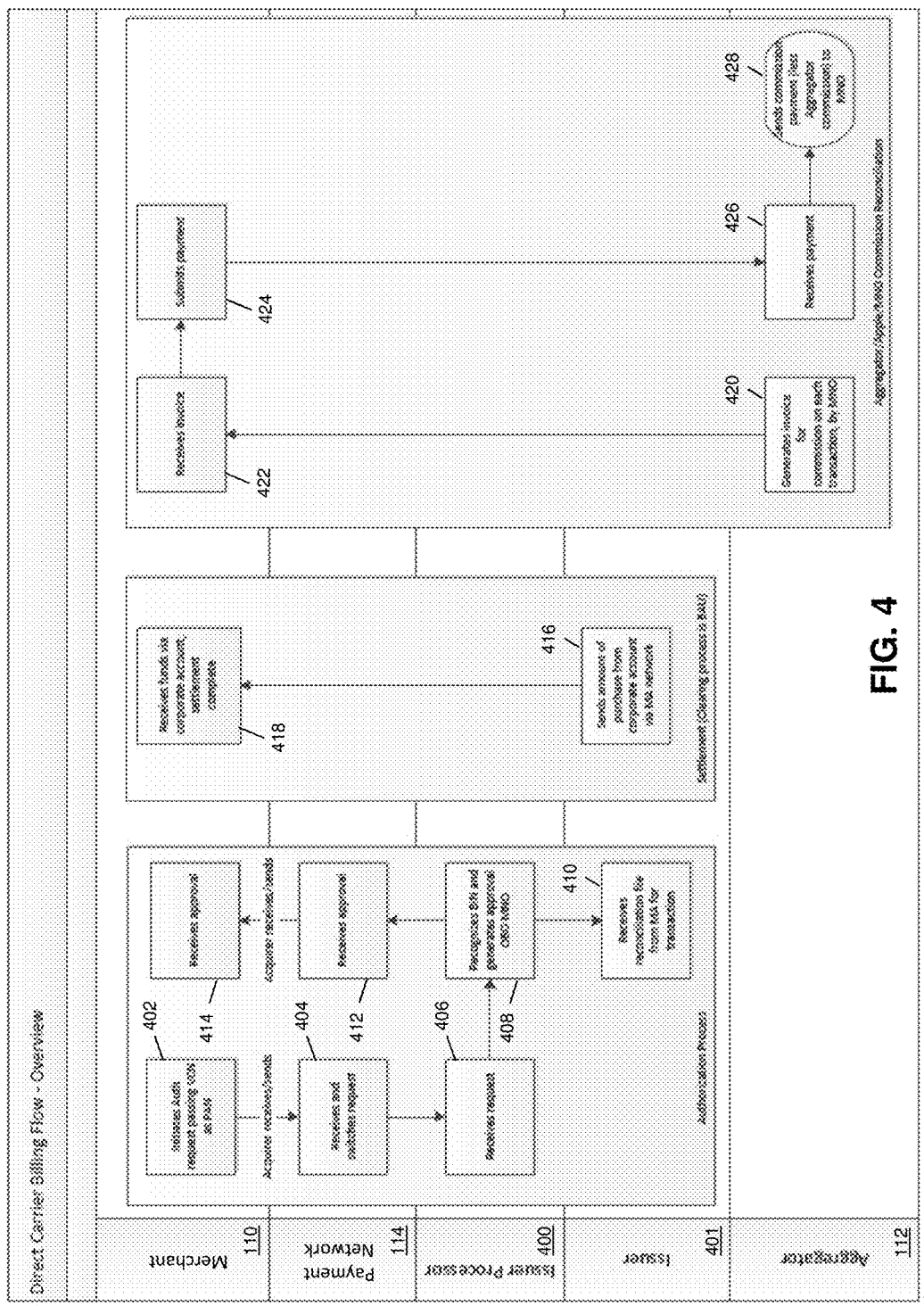
FIG. 4 is a flow diagram illustrating the processing of direct carrier billing transactions using VCNs in accordance with exemplary embodiments.

FIG. 4 illustrates a process for processing payment in the payment transaction using direct carrier billing with a VCN discussed above and illustrated in FIG. 3.

In step 402, the merchant 110 and/or aggregator 112 may initiate processing of the payment transaction for one or more transactions involving the consumer 102, and may use the VCN as the transaction account number used to fund the payment transaction. In some implementations, the VCN may be sent for each transaction, and/or the VCN may be sent to the merchant 110 for a number of MNO-approved transactions. An authorization request may be submitted to the payment network 114 by the merchant 110, and/or an acquiring financial institution, such as an acquiring bank, associated with the merchant 110 and/or the aggregator 112. In step 404, the payment network 114 may switch the VCN for the transaction account number associated with the MNO 106 associated with the VCN, such as based on the VCN's BIN or a mapping of the VCN to the MNO transaction account. The transaction may then be processed using traditional methods and systems.

As part of the transaction processing, in step 406, an issuer processor 400 may receive the authorization request for the transaction that includes the MNO's 106 transaction account number. In step 408, the issuer processor 400 may recognize the account number and may generate approval for the payment transaction (if applicable) on behalf of the MNO 106. As part of the approval, an issuing financial institution 401, such as an issuing bank, associated with the MNO's 106 transaction account may receive a reconciliation file from the payment network 114 and/or the issuer processor 400 regarding the payment transaction. In some embodiments, the issuer processor 400 and issuer 401 may be a single entity. In step 412, the payment network 114 may receive an approval for the transaction from the issuer processor 400, and may, in step 414, forward the approval on to the merchant 110 and/or the acquirer associated with the merchant 110.

After the transaction authorization has been processed, settlement may occur. Settlement may include, in step 416, the sending of the transaction amount for the one or aggregated transactions from the MNO's 106 transaction account to the merchant 110. The merchant 110 may receive the funds for the transaction(s) in step 418. In some embodiments, the sending of the transaction amount may be facilitated using the payment network 114. The clearing process for the transaction may be the same clearing process used in traditional payment transactions that will be apparent to persons having skill in the relevant art.

Once the settlement and clearing for the transaction has been completed, the aggregating entity 112 may, in some embodiments, charge the merchant 110 for commission for the processing of the payment transactions. In step 420, the aggregating entity 112 may generate an invoice for the merchant 110 that includes commission for each of the transactions. In some instances, the commissions may be categorized by MNO 106. In other instances, commissions may be categorized by consumer 102 and/or mobile device 104. In step 422, the invoice may be provided to the merchant 110, who, in step 424, may submit payment for the invoice back to the aggregating entity 112. In step 426, the aggregating entity 112 may receive the payment. In step 428, the aggregating entity 112 may provide payment to the MNO 106 for each respective transaction, less a commission kept by the aggregating entity 112 for its services.

The result of the processes is that the merchant may provide the opportunity for consumers to pay with the phone number, without the need to register as an on-soil merchant via the use of VCNs. As a result, the merchant can avoid the tax disadvantages, while using existing payment infrastructure and still providing the consumer with the benefit of paying using the telephone number of their mobile device. In addition, the existing checkout flow for the consumer 102 is preserved, and in some instances may be improved, such as instances where the mobile device 104 includes the device identifier in the transaction data automatically.

In some instances, each of the entities involved in the system 100 may modify existing systems and infrastructure in order to carry out the processes illustrated in FIGS. 3 and 4, as discussed above. For instance, the merchant 110 may need to modify existing user interfaces in order to enable the consumer 102 to provide their phone number or other device identifier as a payment method. In addition, the merchant 110 may need to be configured to receive the VCN for a consumer 102 and/or mobile device 104 from the aggregating entity 112, and may need to configure transaction initiation to include the VCN in the authorization request instead of a transaction account number where applicable.

The aggregating entity 112 may be required to modify processing systems to maintain (e.g., in the storage database 208) a list of VCNs. In some instances the aggregating entity 112 may be required to communicate with the payment network 114 to request and receive VCNs via an application programming interface. In some implementations, the VCN may be sent for each transaction, and/or the VCN may be sent to the merchant 110 for a number of MNO-approved transactions. The aggregating entity 112 may also be configured to report transactions to the MNO 106, and may be configured to process commissions and payments from the merchant 110 and between the merchant 110 and the MNO 106.

The payment network 114 may be configured to assist with the setup of accounts for the aggregating entity 112 and/or MNO. The payment network 114 may also modify existing systems for the generating and issuing of VCNs associated with the MNOs 106, such as by establishing associated BIN ranges. The payment network 114 may also be configured to provide for integration with the aggregating entity 112, such as via an application programming interface, for receiving request for VCNs and responding thereof.

MNOs 106 may determine reporting requirements to provide to the aggregating entity 112 for the reporting of consumer transactions. The MNO 106 may also establish an account (e.g., with the assistance of the payment network 114) for use in payments to the merchant 110 on behalf of consumers 102.

Figure 5:
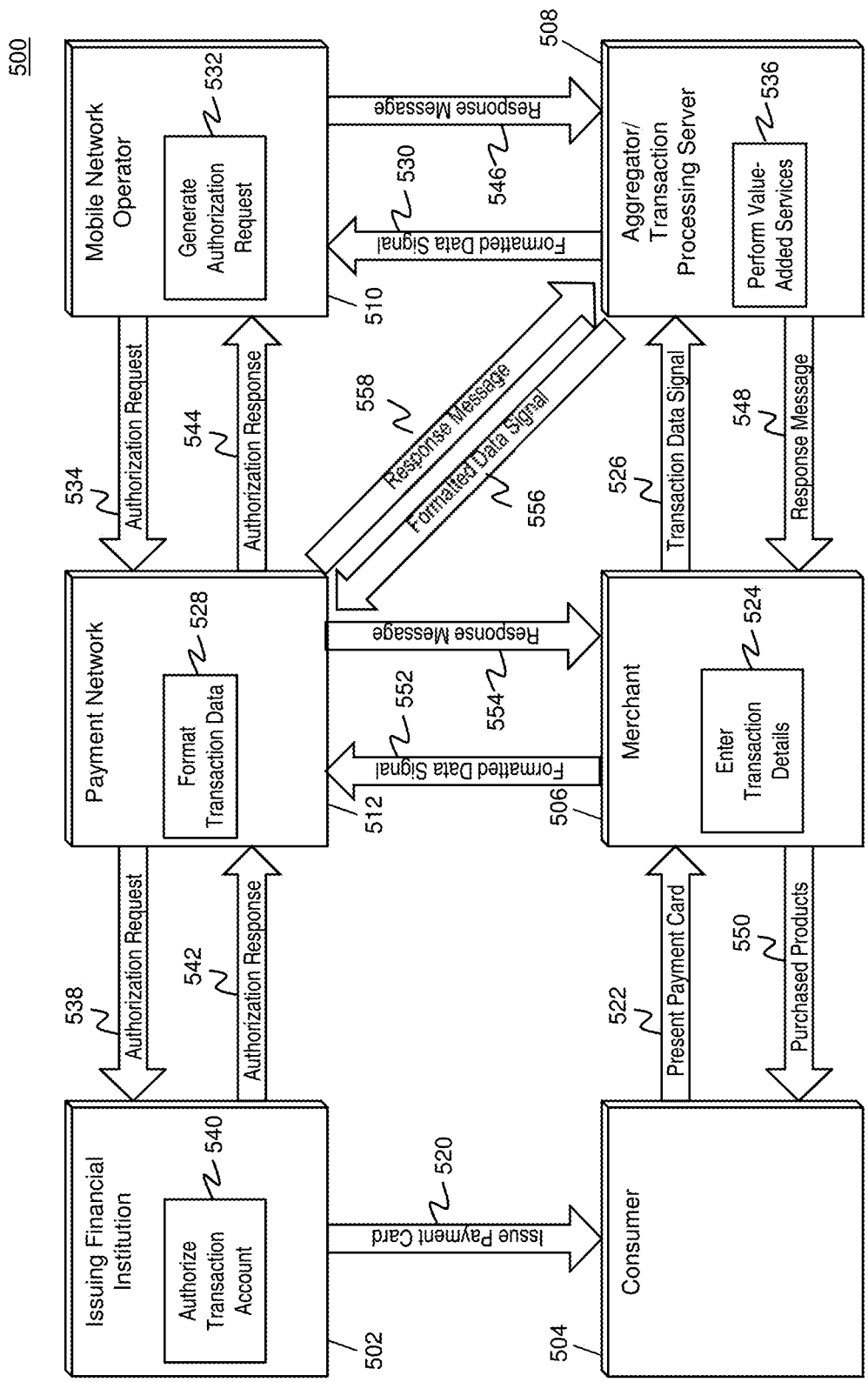
FIG. 5 is a flow diagram illustrating the processing of a payment transaction in accordance with exemplary embodiments.

FIG. 5 illustrates a method 500 for the identification of payment credentials for payment accounts stored in a proxy electronic wallet and associated with the proxy electronic wallet, a paired electronic wallet, or a digital entity.

In step 502, a plurality of account profiles may be stored in an account database (e.g., the storage database 208), wherein each account profile is related to a wallet account and may include at least: a wallet identifier (e.g., pay with phone option 304) and authentication credentials.

In step 504, an account request may be received by a receiving device (e.g., POS terminal) from a specific digital entity of the plurality of digital entities, wherein the account request includes at least a specific account identifier associated with the specific digital entity. For example, the consumer may select one or more products for purchase and may proceed to checkout. As part of the checkout process for the product(s), the consumer may present a payment card 522 using a telephone number and/or other device identifier associated with the mobile device.

In step 506, a phone number may be identified as a payment identifier and passed to the merchant as part of the transaction processing, who, may enter the transaction details 524 and in step 526, may forward the phone number and other transaction data on to the aggregating entity.

In step 508, at least the one or more payment identifiers may be transmitted by a transmitting device. The aggregating entity may receive the payment identifier and, in step 530, may communicate with the MNO associated with the mobile device to verify the payment identifier and receive approval for the transaction.

In step 510, the MNO may receive the transaction data and phone number. In step 546, the MNO may verify the payment identifier and may approve the transaction; such as if the consumer has enough funds in their account, has enough credit, status information, etc.

In step 556, after the aggregating entity receives the transaction approval from the MNO 106, the aggregating entity may send a request for a VCN to the payment network. The request may include at least the phone number associated with the mobile device 104 and information identifying the MNO 106 and/or a transaction account associated thereof. The payment network may receive the request and may identify a VCN to be used for transactions involving the mobile device.

In step 558, the VCN may be provided to the aggregating entity that may provide the VCN and approval of the transaction back to the merchant. In some implementations, the aggregating entity may initiate an authorization request to continue processing of the payment transaction with the payment network.

In step 548, the merchant may receive the VCN and approval. In step 552, the merchant may request approval for processing payment in the payment transaction using direct carrier billing with a VCN. The merchant and/or aggregator may initiate processing of the payment transaction for one or more transactions involving the consumer, and may use the VCN as the transaction account number used to fund the payment transaction. In some implementations, the VCN may be sent for each transaction, and/or the VCN may be sent to the merchant 110 for a number of MNO-approved transactions. The payment network may switch 528 the VCN for the transaction account number associated with the MNO associated with the VCN.

In step 512, a set of credentials associated with the specific payment identifier in the specific account profile may be identified by the processing device, where the set of credentials is a first set of payment credentials of the one or more first sets of payment credentials is the specific payment identifier is selected from the one or more payment identifiers, and is an additional set of credentials of one of the one or more additional sets of credentials if the specific payment identifier is selected from the one or more additional payment identifiers corresponding to each of the one or more paired wallet identifiers. In step 538, the transaction may then be processed using traditional methods and systems. At step 542, the issuing financial institution may approve the transaction. In step 554, the payment network may transmit approval to the merchant. In step 550, the consumer 102 may receive approval of the transaction, which may include receiving the transacted-for products.

In some embodiments, the identified set of credentials may be transmitted to the specific digital entity as a response to the received account request. In one embodiment, the identified set of credentials may comprise payment credentials suitable for inclusion in a transaction message associated with a payment transaction for funding of the payment transaction. In some embodiments, the account request may further include supplied authentication credentials, and the method 500 may also include validating, by the processing device, the supplied authentication credentials based on the authentication credentials stored in the specific account profile.

In some implementations, the method 500 may comprise: receiving, by an aggregator from a merchant, a transaction data signal electronically transmitted via a communication network, wherein the data signal is superimposed with a transaction request comprising a device identifier of a consumer mobile device affiliated with a consumer account and a transaction amount; transmitting, by the aggregator to a mobile network operator (MNO), an authorization message formatted based on one or more standards configured to indicate an authorization request for approval of the transaction request; receiving, by the aggregator from the MNO, an approval transaction data signal electronically transmitted via a communication network, wherein the data signal is superimposed with approval of the transaction request confirming the consumer account has enough available funding to complete the transaction; transmitting, by the aggregator to a payment network, a request message formatted based on one or more standards configured to indicate a virtual card number (VCN) request associated with the MNO's transaction account for the transaction amount; receiving, by the aggregator from the payment network, a VCN transaction data signal electronically transmitted via a communication network, wherein the data signal is superimposed with a VCN in response to the VCN request, wherein the VCN is associated with the MNO's transaction account; and transmitting, to the payment network, a VCN message formatted based on one or more standards configured to indicate the VCN initiation of a payment transaction.

When the VCN is transmitted for initiation of payment transaction, the payment network may switch the VCN for the transaction account number associated with the MNO associated with the VCN to process payment. In some implementations, the VCN may be sent for each transaction, and/or the VCN may be sent to the merchant 110 for a number of MNO-approved transactions. The MNO may approve the transaction based on the availability of pre-paid funds in the consumer account. The one or more standards may include the ISO8583 standard. The aggregator may request a VCN from the payment network after the MNO approves the transaction. In some implementations, after the merchant receives the VCN, the merchant processes the transaction through the payment network. In other implementations, after the merchant receives the VCN, the merchant may aggregate transactions for processing of payment of a single, aggregate payment transaction through the payment network. After the payment network receives the VCN initiation of a payment transaction, the payment network may switch the VCN for the transaction account number associated with the MNO associated with the VCN and process the transaction.

Computer System Architecture

Figure 6:
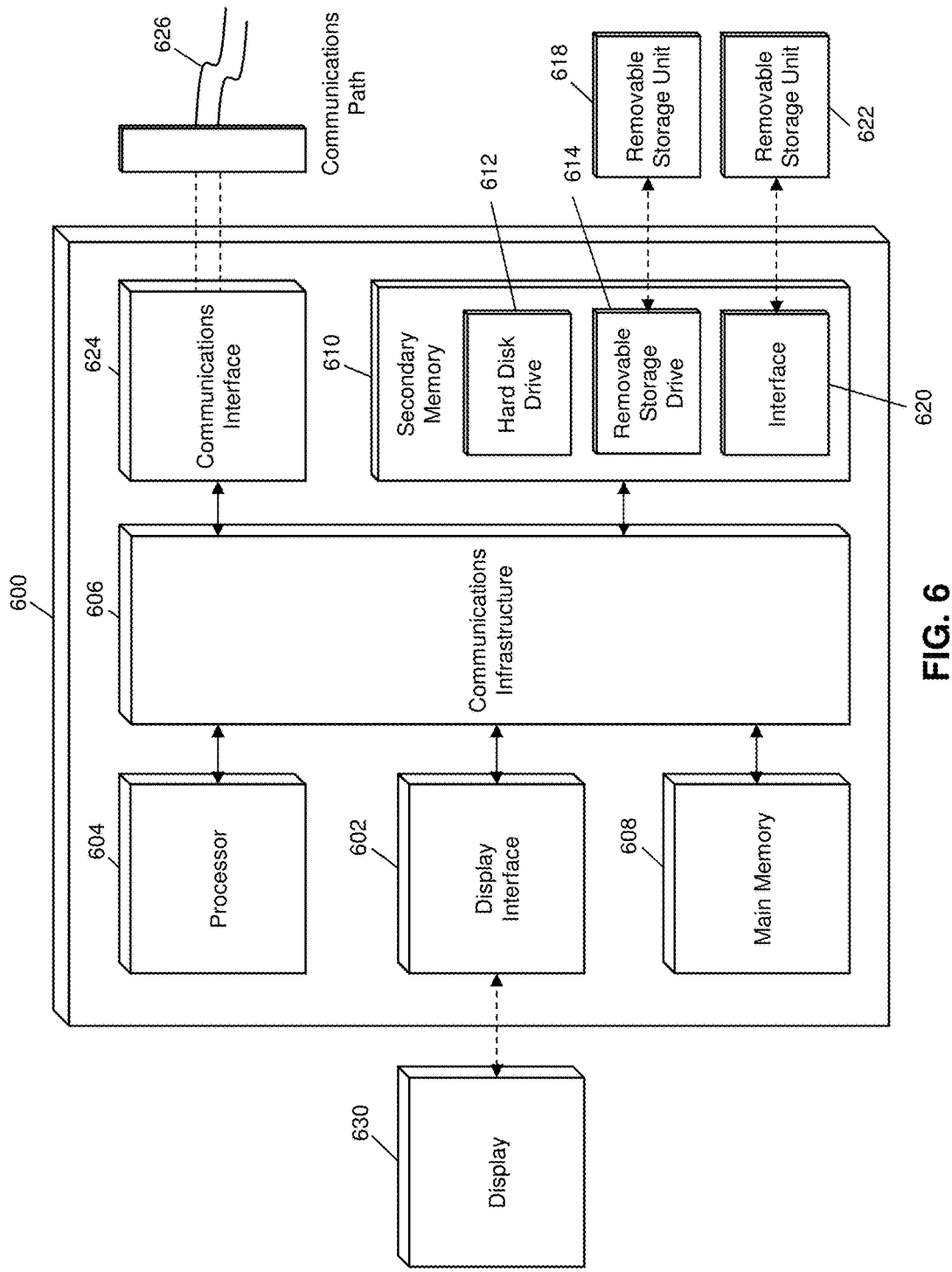
FIG. 6 is a block diagram illustrating computer system architecture in accordance with exemplary embodiments.

FIG. 6 illustrates a computer system 600 in which embodiments of the present disclosure, or portions thereof, may be implemented as computer-readable code. For example, systems of the merchant 110, consumer 102, mobile device 104, aggregating entity 112, issuer processor 400, issuer 401, payment network 114, and MNO 106 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3 and 4, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

Techniques consistent with the present disclosure provide, among other features, systems and methods for processing payment transactions. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for processing a transaction using a virtual card number (VCN) as payment to a merchant, comprising:

receiving, by an aggregator from a merchant, a transaction data signal electronically transmitted via a communication network, wherein the data signal is superimposed with a transaction request comprising a device identifier of a consumer mobile device affiliated with a consumer account and a transaction amount;

transmitting, by the aggregator to a mobile network operator (MNO), an authorization message formatted based on one or more standards configured to indicate an authorization request for approval of the transaction request;

receiving, by the aggregator from the MNO, an approval transaction data signal electronically transmitted via a communication network, wherein the data signal is superimposed with approval of the transaction request confirming the consumer account has enough available funding in a transaction account of the MNO to complete the transaction;

transmitting, by the aggregator to a payment network, a request message formatted based on one or more standards configured to indicate the virtual card number request associated with the MNO's transaction account for the transaction amount;

receiving, by the aggregator from the payment network, a VCN transaction data signal electronically transmitted via a communication network, wherein the data signal is superimposed with a VCN in response to the VCN request, wherein the VCN is associated with the MNO's transaction account number; and transmitting, to the payment network, a VCN message formatted based on one or more standards configured to indicate the VCN initiation of a payment transaction.

2. The method of claim 1, wherein when the VCN is transmitted for initiation of payment transaction, the payment network switches the VCN for the transaction account number associated with the MNO associated with the VCN to process payment.

3. The method of claim 1, wherein the device identifier is at least one of: telephone numbers, media access control (MAC) addresses, a unique device id (UUID), an international mobile station equipment identity (IMEI), internet protocol address, serial numbers, registration numbers, or usernames.

4. The method of claim 1, wherein the MNO approves the transaction based on the availability of pre-paid funds in the consumer account.

5. The method of claim 1, wherein the one or more standards includes the ISO8583 standard.

6. The method of claim 1, wherein the aggregator requests the VCN from the payment network after the MNO approves the transaction.

7. The method of claim 1, wherein the VCN may comprise at least one of: a bank identification number (BIN), a credit card number, a debit card number, or a check number.

8. The method of claim 1, wherein the VCN message is transmitted to the merchant for a plurality of MNO-approved transactions.

9. The method of claim 8, wherein after the merchant receives the VCN message, the merchant aggregates transactions for processing of payment of a single, aggregate payment transaction through the payment network.

10. The method of claim 1, wherein after the payment network receives the VCN initiation of a payment transaction, the payment network switches the VCN for the transaction account number associated with the MNO associated with the VCN and processes the transaction.

11. A system for processing a transaction using a virtual card number (VCN) as payment to a merchant, comprising: a receiving device of an aggregator server configured to: receive, from a merchant, a transaction data signal electronically transmitted via a communication network, wherein the data signal is superimposed with a transaction request comprising a device identifier of a consumer mobile device affiliated with a consumer account and a transaction amount; and a transmitting device of the aggregator server configured to: transmit, to a mobile network operator (MNO), an authorization message formatted based on one or more standards configured to indicate an authorization request for approval of the transaction request; wherein the receiving device of the aggregator server is further configured to receive, from the MNO, an approval transaction data signal electronically transmitted via a communication network, wherein the data signal is superimposed with approval of the transaction request confirming the consumer account has enough available funding in a transaction account of the MNO to complete the transaction, wherein the transmitting device of the aggregator server is further configured to transmit, to a payment network, a request message formatted based on one or more standards configured to indicate the virtual card number request associated with the MNO's transaction account for the transaction amount, wherein the receiving device of the aggregator server is further configured to receive, from the payment network, a VCN transaction data signal electronically transmitted via a communication network, wherein the data signal is superimposed with a VCN in response to the VCN request, wherein the VCN is associated with the MNO's transaction account number, and wherein the transmitting device of the aggregator server is further configured to transmit to the payment network, a VCN message formatted based on one or more standards configured to indicate the VCN initiation of a payment transaction.

12. The system of claim 11, wherein when the VCN is transmitted for initiation of payment transaction, the payment network switches the VCN for the transaction account number associated with the MNO associated with the VCN to process payment.

13. The system of claim 11, wherein the device identifier is at least one of: telephone numbers, media access control (MAC) addresses, a unique device id (UUID), an international mobile station equipment identity (IMEI), internet protocol address, serial numbers, registration numbers, and usernames.

14. The system of claim 11, wherein the MNO approves the transaction based on the availability of pre-paid funds in the consumer account.

15. The system of claim 11, wherein the one or more standards includes the ISO8583 standard.

16. The system of claim 11, wherein the aggregator requests the VCN from the payment network only after the MNO approves the transaction.

17. The system of claim 11, wherein the VCN may comprise at least one of: a bank identification number (BIN), a credit card number, a debit card number, or a check number.

18. The system of claim 11, wherein the VCN message is transmitted to the merchant for a plurality of MNO-approved transactions.

19. The system of claim 18, wherein after the merchant receives the VCN message, the merchant aggregates transactions for processing of payment of a single, aggregate payment transaction through the payment network.

20. The system of claim 11, wherein after the payment network receives the VCN initiation of a payment transaction, the payment network switches the VCN for the transaction account number associated with the MNO associated with the VCN and processes the transaction.

* * * * *